US009329069B2

(12) United States Patent
Custer et al.

(10) Patent No.: US 9,329,069 B2
(45) Date of Patent: May 3, 2016

(54) LIQUID LEVEL SYSTEM WITH BLOWDOWN FEATURE

(71) Applicants: Robert A. Custer, Brunswick, OH (US); Christopher W. Fadden, Medina, OH (US); Steven R. McGuigan, Richfield, OH (US)

(72) Inventors: Robert A. Custer, Brunswick, OH (US); Christopher W. Fadden, Medina, OH (US); Steven R. McGuigan, Richfield, OH (US)

(73) Assignee: Clark-Reliance Corporation, Strongsville, OH (US)

( * ) Notice: Subject to any disclaimer, the term of this patent is extended or adjusted under 35 U.S.C. 154(b) by 166 days.

(21) Appl. No.: 14/095,274

(22) Filed: Dec. 3, 2013

(65) Prior Publication Data

US 2014/0159906 A1    Jun. 12, 2014

Related U.S. Application Data

(60) Provisional application No. 61/735,146, filed on Dec. 10, 2012.

(51) Int. Cl.
*G01F 23/00* (2006.01)
(52) U.S. Cl.
CPC ..................................... *G01F 23/00* (2013.01)
(58) Field of Classification Search
CPC ..... G01F 23/00; G01F 23/268; G01F 23/242; G01F 23/263; G01F 23/22; F24H 9/2007
See application file for complete search history.

(56) References Cited

U.S. PATENT DOCUMENTS

| | | |
|---|---|---|
| 3,269,364 A | 8/1966 | Higgins |
| 3,680,531 A | 8/1972 | Holdt |
| 3,862,395 A | 1/1975 | Eaton |
| 3,908,605 A | 9/1975 | Andersen |
| 4,047,099 A | 9/1977 | Berger et al. |
| 4,285,302 A | 8/1981 | Kelly |
| 4,406,794 A | 9/1983 | Brigante |
| 4,460,008 A | 7/1984 | O'Leary et al. |
| 4,465,026 A | 8/1984 | Carberry |
| 4,465,088 A | 8/1984 | Vosper |
| 4,507,521 A | 3/1985 | Goellner |
| 4,599,975 A | 7/1986 | Reeve et al. |
| 4,938,174 A | 7/1990 | Bennett |
| 4,941,435 A | 7/1990 | Person |
| 5,152,252 A | 10/1992 | Bolton et al. |
| 5,220,514 A | 6/1993 | John |
| 5,386,192 A | 1/1995 | Marrone |
| 6,223,129 B1 | 4/2001 | Chan et al. |
| 6,390,027 B1 | 5/2002 | Lyons et al. |
| 6,529,841 B2 | 3/2003 | Cocking et al. |
| 6,575,010 B2 | 6/2003 | Colman et al. |
| 6,650,128 B2 | 11/2003 | Sanders |
| 6,655,322 B1 | 12/2003 | Godwin et al. |
| 6,666,086 B2 | 12/2003 | Colman et al. |
| 7,007,408 B2 | 3/2006 | Howland, Jr. et al. |
| 7,243,540 B2 | 7/2007 | Merwin |

(Continued)

OTHER PUBLICATIONS

EDLI Electronic Drum Level Indicator—ELS Electronic Level Switch, Levelstate Systems Ltd., publicly available prior to Dec. 10, 2012 (15 pages).

(Continued)

*Primary Examiner* — James Yang
(74) *Attorney, Agent, or Firm* — Calfee, Halter & Griswold LLP

(57) ABSTRACT

The present invention provides a liquid level system with a blowdown feature.

21 Claims, 6 Drawing Sheets

(56) References Cited

U.S. PATENT DOCUMENTS

| | | | |
|---|---|---|---|
| 7,523,645 B2 | 4/2009 | Gammon | |
| 8,332,161 B2 | 12/2012 | Diehl et al. | |
| 2002/0108440 A1* | 8/2002 | Colman | F22B 37/54 73/304 R |
| 2004/0181349 A1* | 9/2004 | Tynkov | F22B 35/18 702/55 |
| 2011/0290723 A1 | 12/2011 | Bonnelye et al. | |

OTHER PUBLICATIONS

EDLI Electronic Drum Level Indicators & ELS Electronic Level Switch, Levelstate Systems Ltd., publicly available prior to Dec. 10, 2012 (9 pages).

RLG—Conductivity electrode type level indicators, Cesare Bonet S.p.A., publicly available prior to Dec. 10, 2012 (8 pages).

MERLI—Multi-Electrode Remote Level Indicator—An Indirect Level Reading Device, Diamond Power Specialty Company, publicly available prior to Dec. 10, 2012 (1 page).

Controlling TDS in the Boiler Water, Spirax Sarco, publicly available prior to Dec. 10, 2012 (17 pages).

Hydrastep & Hydratect—Water/Steam Monitoring Systems, Emerson Process Management, Mobrey Measurement, Mobrey Inc., publicly available prior to Dec. 10, 2012, believed to be publicly available in Sep. 2005 (8 pages).

Installation, Operation and Instruction Manual—Level-Trac Model 202 Control Unit, Quest-Tec Solutions, publicly available prior to Dec. 10, 2012, believed to be publicly available on Aug. 1, 2004 (35 pages).

Level-Trac Model LT-202 Water Detection Control Unit, Quest-Tec Solutions, publicly available prior to Dec. 10, 2012, believed to be publicly available on Aug. 1, 2004 (1 page).

Level-Trac Model LT-201 Water Detection Control Unit, Quest-Tec Solutions, publicly available prior to Dec. 10, 2012, believed to be publicly available on Aug. 1, 2004 (1 page).

Level Master—Water Level Control System, Cleaver Brooks, Fossil Steam Technologies, Inc., publicly available prior to Dec. 10, 2012, believed to be publicly available in Jun. 2003 (9 pages).

Electrode Type Level Gauge, Level Transmitter & Level Switch—SEL Series, Sam II Industry Co., Ltd., publicly available prior to Dec. 10, 2012, believed to be publicly available on Apr. 3, 2003 (12 pages).

Penberthy Series 12A—Electronic Level Indication, Tyco Valves & Controls, publicly available prior to Dec. 10, 2012, believed to be publicly available in 2002 (2 pages).

Electro Eye-Hye Boiler Control Systems—Electro Eye-Hye Standard—Electro Eye-Hye 2000, Clark-Reliance Corporation, publicly available on Oct. 31, 2000 (6 pages).

Electro Eye-Hye 2000—Microprocessor Based Boiler Level Controller, Clark-Reliance Corporation, publicly available in Apr. 2006 (36 pages).

Electro Eye-Hye Boiler Control Systems—The Standard, Clark-Reliance Corporation, publicly available in Dec. 2007 (6 pages).

\* cited by examiner

LIQUID LEVEL SYSTEM WITH BLOWDOWN FEATURE

CROSS-REFERENCE TO RELATED APPLICATION

This application claims the benefit of U.S. Provisional Application No. 61/735,146, filed Dec. 10, 2012, the entire disclosure of which is hereby incorporated by reference.

FIELD

The present invention relates generally to a liquid level system, and, more particularly, to a liquid level system with a blowdown feature.

BACKGROUND

Liquid columns, such as water columns, are known. Liquid columns are used to determine the level of liquid in vessels (such as boilers, tanks, and drums). Liquid level indicators are also known. Liquid level indicators are connected to liquid columns and are used to display the level of liquid in vessels.

Liquid columns include probes. The probes are used to determine the level of liquid in the liquid column and, thus, the level of liquid in the vessel. Over time, the probes can become contaminated leading to inaccurate liquid level readings. In order to reduce contamination and, thus inaccurate liquid level readings, the probes should be periodically cleaned. Determining when to clean the probes can be difficult.

SUMMARY

The present invention provides a liquid level system with a blowdown feature.

In an exemplary embodiment, the system includes a column, a control unit, and an output device. The column is operable to be fluidly connected to a vessel for holding a liquid so that the level of liquid in the column corresponds to the level of liquid in the vessel. The column includes a housing and a plurality of probes. The housing has a first end and a second end. The probes are operable to be inserted at least partially into the housing. The probes are spaced apart in the housing between the first end and the second end. The control unit is operable to be electrically connected to each probe. The control unit is configured to receive probe readings from each probe. The control unit is configured to determine whether each probe is in liquid or in steam and to further determine whether a blowdown condition exists. The control unit uses the probe readings, a plurality of parameters, a blowdown timer, and a blowdown flag to determine whether each probe is in liquid or in steam and to further determine whether the blowdown condition exists. The plurality of parameters includes an offset upper threshold parameter that indicates a probe is becoming contaminated and in steam, a blowdown upper threshold parameter that indicates a probe is contaminated and in steam, a blowdown lower threshold parameter that indicates a probe is contaminated and in liquid, and an offset lower threshold parameter that indicates a probe is becoming contaminated and in liquid. The output device is operable to be electrically connected to the control unit. The output device is configured to signal whether each probe is in liquid or in steam and to further signal whether the blowdown condition exists. When a probe reading is at or between the offset upper threshold and the offset lower threshold, the blowdown timer is started. After the blowdown timer is started, when each subsequent probe reading is at or between the offset upper threshold and the offset lower threshold for a predetermined period of time, the blowdown flag is set. After the blowdown flag is set, when a subsequent probe reading is at or between the blowdown upper threshold and the blowdown lower threshold, the output device signals that the blowdown condition exists.

In an exemplary embodiment, the system includes a column, a control unit, and an output device. The column is operable to be fluidly connected to a vessel for holding a liquid so that the level of liquid in the column corresponds to the level of liquid in the vessel. The column includes a housing and a plurality of probes. The housing has a first end and a second end. The probes are operable to be inserted at least partially into the housing. The probes are spaced apart in the housing between the first end and the second end. The control unit is operable to be electrically connected to each probe. The control unit is configured to receive probe readings from each probe. The control unit is configured to determine whether each probe is in liquid or in steam and to further determine whether a blowdown condition exists. The control unit uses the probe readings, a plurality of parameters, a blowdown timer, and a blowdown flag to determine whether each probe is in liquid or in steam and to further determine whether the blowdown condition exists. The plurality of parameters includes a good steam reading parameter that indicates a probe is clean and in steam, an offset upper threshold parameter that indicates a probe is becoming contaminated and in steam, a blowdown upper threshold parameter that indicates a probe is contaminated and in steam, a blowdown lower threshold parameter that indicates a probe is contaminated and in liquid, an offset lower threshold parameter that indicates a probe is becoming contaminated and in liquid, a good liquid reading parameter that indicates a probe is clean and in liquid, and a steam/liquid threshold parameter that indicates a midpoint between the good steam reading parameter and the good liquid reading parameter. The output device is operable to be electrically connected to the control unit. The output device is configured to signal whether each probe is in liquid or in steam and to further signal whether the blowdown condition exists. When a probe reading is at or between the offset upper threshold and the offset lower threshold, the blowdown timer is started. After the blowdown timer is started, when each subsequent probe reading is at or between the offset upper threshold and the offset lower threshold for a predetermined period of time, the blowdown flag is set. After the blowdown flag is set, when a subsequent probe reading is at or between the blowdown upper threshold and the blowdown lower threshold, the output device signals that the blowdown condition exists.

In an exemplary embodiment, the system includes a control unit. The control unit is operable to be electrically connected to probes in a liquid column. The control unit is configured to receive probe readings from each probe. The control unit is configured to determine whether each probe is in liquid or in steam and to further determine whether a blowdown condition exists. The control unit uses the probe readings, a plurality of parameters, a blowdown timer, and a blowdown flag to determine whether each probe is in liquid or in steam and to further determine whether the blowdown condition exists. The plurality of parameters includes an offset upper threshold parameter that indicates a probe is becoming contaminated and in steam, a blowdown upper threshold parameter that indicates a probe is contaminated and in steam, a blowdown lower threshold parameter that indicates a probe is contaminated and in liquid, and an offset lower threshold parameter that indicates a probe is becoming contaminated and in liquid. When a probe reading is at or between the offset upper threshold and the offset lower threshold, the blowdown timer is started. After the blowdown timer is started, when each subsequent probe reading is at or between the offset upper threshold and the offset lower threshold for a predetermined period of time, the blowdown flag is set. After the blowdown flag is set, when a subsequent probe reading is at or between the blowdown upper threshold and the blowdown lower threshold, the output device signals that the blowdown condition exists.

DETAILED DESCRIPTION

Figure 1:
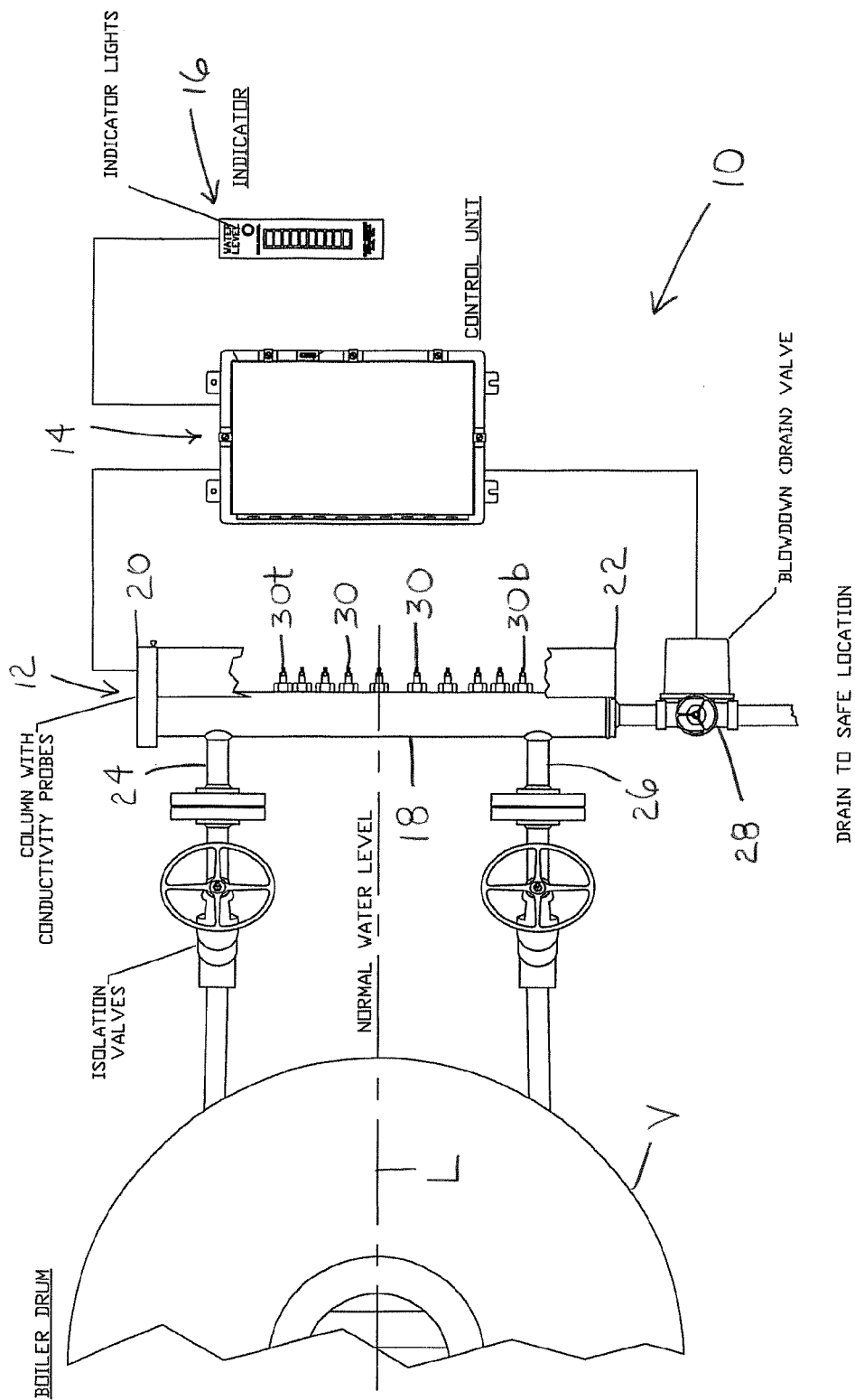
FIG. 1 is a schematic illustration of a liquid level system according to an exemplary embodiment of the present invention.
Figure 2:
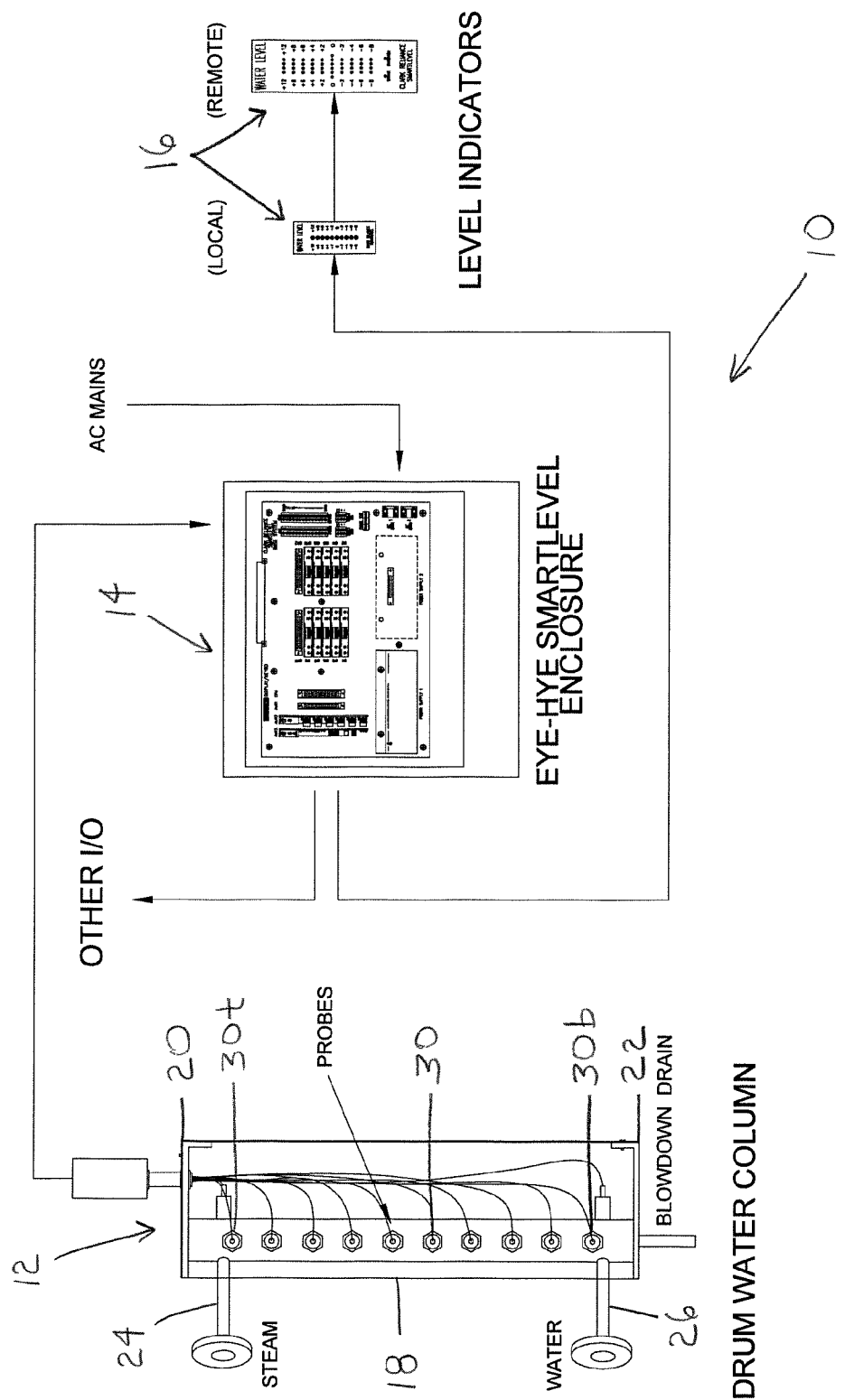
FIG. 2 is another schematic illustration of the liquid level system of FIG. 1.

The present invention provides a liquid level system with a blowdown feature. An exemplary embodiment of a liquid level system 10 of the present invention is illustrated in FIGS. 1 and 2. In the exemplary embodiment, the liquid level system 10 includes a liquid column 12, a control unit 14, and at least one output device 16.

The liquid column 12 is fluidly connected to a vessel V (such as a boiler, tank, or drum) for holding a liquid. The liquid column 12 is connected in parallel to the vessel V. The liquid column 12 is mounted in a vertical orientation.

The liquid column 12 includes a housing 18 having a top end 20 and a bottom end 22. The liquid column 12 includes a top fluid connection 24 near the top end 20 of the housing 18, a bottom fluid connection 26 near the bottom end 22 of the housing 18, and a drain valve 28 at the bottom end 22 of the housing 18. The liquid column 12 is mounted at a height that enables the top end 20 of the housing 18 and the top fluid connection 24 to be above a normal liquid level L of the vessel V (i.e., in steam) and the bottom end 22 of the housing 18 and the bottom fluid connection 26 to be below the normal liquid level L of the vessel V (i.e., in liquid).

Additionally, the liquid column 12 includes a plurality of probes 30. In an exemplary embodiment, the probes 30 are conductance probes. One embodiment of a probe for use in the liquid column 12 is described in U.S. Pat. No. 4,507,521 issued to Goellner for High Pressure Electrical Conductivity Probe, which patent is incorporated herein by reference. The probes 30 are inserted at least partially into the housing 18. The probes 30 are vertically spaced apart in the housing 18. In the illustrated embodiment, a top probe 30$t$ is near the top fluid connection 24 and a bottom probe 30$b$ is near the bottom fluid connection 26. The remainder of the probes 30 are spaced between the top probe 30$t$ and the bottom probe 30$b$. In the illustrated embodiment, the probes 30 are not evenly spaced in the housing 18. However, one of ordinary skill in the art will appreciate that the probes 30 could be evenly spaced in the housing 18. When a probe 30 is below the level of liquid in the liquid column 12, the probe 30 provides electrical contact with the liquid inside the liquid column 12. The liquid column 12 is electrically grounded at the control unit 14. As a result, a conductive loop is formed by each probe 30 that is below the level of liquid in the liquid column 12 and allows for the indication of liquid at that level. Conversely, when a probe 30 is above the level of liquid in the liquid column 12, the probe 30 does not provide electrical contact with the liquid inside the liquid column 12. As a result, a conductive loop is not formed by any probe 30 that is above the level of liquid in the liquid column 12 and allows for the indication of steam at that level.

Figure 3:
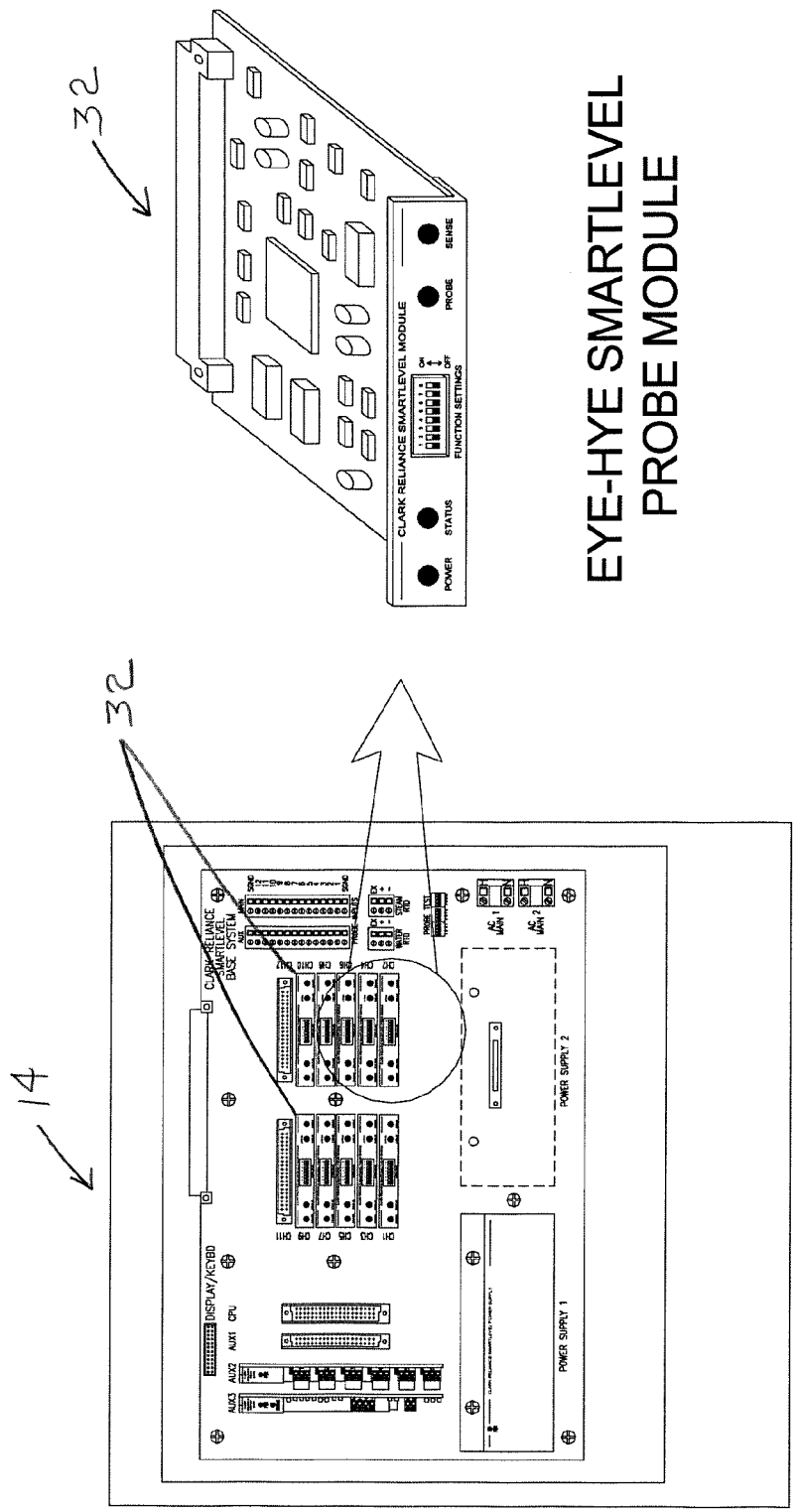
FIG. 3 is a schematic illustration of a control unit and a probe module of the liquid level system of FIG. 1.
Figure 4:
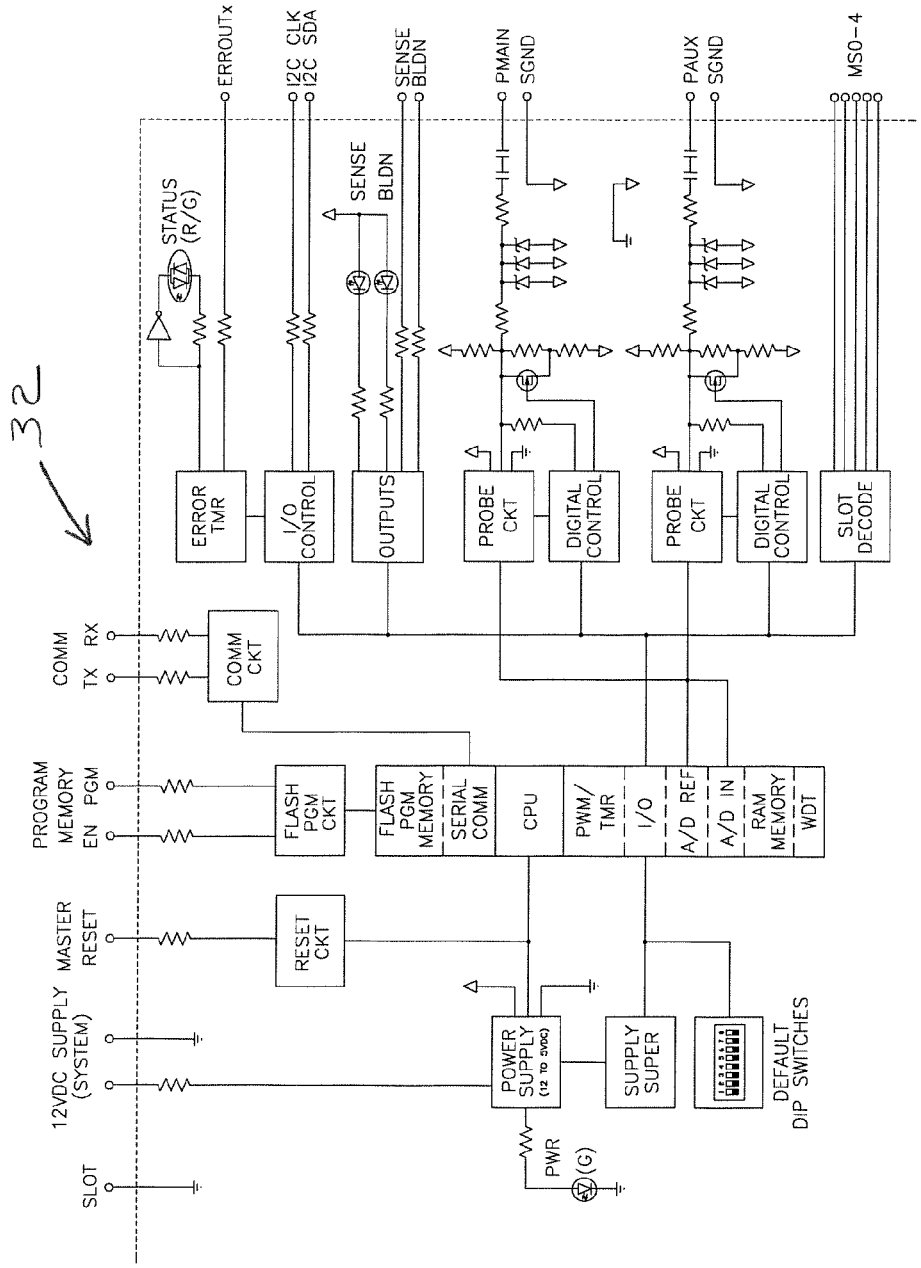
FIG. 4 is a schematic illustration of circuit components of the probe module of FIG. 3.

The control unit 14 is electrically connected to each probe 30. The control unit 14 receives probe readings from each probe 30 and, based on these probe readings, determines whether each probe 30 is in liquid or in steam and whether a blowdown condition exists (i.e., whether a probe is contaminated). In an exemplary embodiment, the control unit 14 includes at least one probe module 32, as illustrated in FIG. 3. In this case, each probe 30 is electrically connected to a probe module 32. In another exemplary embodiment, the control unit 14 includes one probe module 32 for each probe 30, as also illustrated in FIG. 3. In this case, each probe 30 is electrically connected to a separate probe module 32. In the illustrated embodiment, the liquid column 12 includes ten probes 30 and the control unit 14 includes ten probe modules 32. Each probe module 32 sends signals to and receives signals from the corresponding probe 30 and, based on these signals, determines whether the probe 30 is in liquid or in steam and whether the probe 30 is clean, becoming contaminated, or is contaminated. Each probe module 32 includes circuit components controlled by a processor to make these determinations. In an exemplary embodiment, each probe module 32 includes the circuit components illustrated in FIG. 4.

The output device 16 is electrically connected to the control unit 14. The output device 16 signals when each probe 30 is in liquid or in steam and whether a blowdown condition exists (i.e., whether a probe is contaminated). In an exemplary embodiment, the output device 16 includes a level indicator. In another exemplary embodiment, the output device 16 includes an electronic system interface. In an exemplary embodiment, the level indicator includes a local indicator located at the vessel V. In another exemplary embodiment, the level indicator includes a remote indicator located away from the vessel V (e.g., in a control room). In the illustrated embodiment, the level indicator includes both a local indicator and a remote indicator. In an exemplary embodiment, the level indicator is an LED indicator.

One embodiment of a liquid level system, including a liquid column, a control unit for determining the level of liquid in the liquid column, and an output device for displaying the level of liquid in the liquid column is manufactured and sold by Clark-Reliance Corporation under the name "EYE-HYE" system. The "EYE-HYE" system is described in a document titled "Clark-Reliance Electro Eye-Hye System Installation and Maintenance Instructions," which document is available as "Form 539CR1 Rev. 10/98" at wwww-.clarkreliance.com/site/applications/DocumentLibraryManager/upload/539CR1%20Eye-Hye.pdf and is incorporated herein by reference. Liquid level systems of this type are well-known and, therefore, will not be described in greater detail.

In operation, liquid from the vessel V enters the liquid column 12 to a level that corresponds to the level of liquid in the vessel V. The output device 16 displays the level of liquid in the liquid column 12. Since the level of liquid in the liquid column 12 corresponds to the level of liquid in the vessel V, the user can determine the level of liquid in the vessel V by observing the level of liquid in the liquid column 12 on the output device 16.

Generally, when a probe 30 is above the level of liquid in the liquid column 12, the voltage read at the probe 30 is approximately the same as the voltage applied to the probe 30. Conversely, when a probe 30 is below the level of liquid in the liquid column 12, the voltage read at the probe 30 is significantly less than the voltage applied to the probe 30. By reading the voltage at the probe 30 and comparing it to the voltage applied to the probe 30, the control unit 14 (and, more specifically, the corresponding probe module 32) determines whether the probe 30 is above or below the level of liquid in the liquid column 12.

When the housing 18 and the probes 30 are clean, the liquid level system 10 operates properly. However, when the housing 18 and/or a probe 30 becomes contaminated, the liquid level system 10 will not operate properly. More specifically, the housing 18 and/or the probe 30 may have a build-up of material that causes an inaccurate liquid level reading.

In order to properly maintain the liquid level system 10, the housing 18 and the probes 30 need to be cleaned. One process for cleaning the housing 18 and the probes 30 is referred to as a blowdown. In a blowdown, the bottom fluid connection 26 is closed and the drain valve 28 is opened. As a result, the liquid in the liquid column 12 drains from the housing 18 causing the steam in the housing 18 to blowdown through the housing 18 and clean the housing 18 and the probes 30. As a part of routine maintenance of the liquid level system 10, a blowdown is periodically conducted. However, if the blowdown is conducted too frequently, resources are wasted and the probes 30 can be subjected to unnecessary wear. Conversely, if the blowdown is conducted too infrequently, the liquid level system 10 may display an inaccurate liquid level.

In addition to determining whether each probe 30 is in liquid or in steam, the control unit 14 (and, more specifically, the corresponding probe module 32) determines whether each probe 30 is contaminated. If a probe 30 is determined to be contaminated, a blowdown can be initiated. If no probe 30 is determined to be contaminated, no blowdown is needed.

The control unit 14 uses a number of parameters to determine whether a probe 30 is in liquid or is in steam and to further determine whether a probe 30 is clean, becoming contaminated, or is contaminated. These parameters include:

1. GS—good steam reading—approximate value of a good steam reading—a probe reading around this value indicates that the probe 30 is clean and in steam—in an exemplary embodiment, this value is approximately 255 units;
2. OU—offset upper threshold—a probe reading at or below this value and at or above the steam/liquid threshold indicates that the probe 30 is becoming contaminated and in steam—in an exemplary embodiment, this value is approximately 205 units;
3. BU—blowdown upper threshold—a probe reading at or below this value and at or above the steam/liquid threshold indicates that the probe 30 is contaminated and in steam—in an exemplary embodiment, this value is approximately 200 units;
4. TV—steam/liquid threshold—approximate value of a midpoint between a good steam reading and a good liquid reading—a probe reading at or above this value indicates that the probe 30 is in steam and below this value indicates that the probe 30 is in liquid—in an exemplary embodiment, this value is approximately 192 units;
5. BL—blowdown lower threshold—a probe reading at or above this value and below the steam/liquid threshold indicates that probe 30 is contaminated and in liquid—in an exemplary embodiment, this value is approximately 184 units;
6. OL—offset lower threshold—a probe reading at or above this value and below the steam/liquid threshold indicates that the probe 30 is becoming contaminated and in liquid—in an exemplary embodiment, this value is approximately 179 units; and
7. GW—good liquid reading—approximate value of a good liquid reading—a probe reading around this value indicates that the probe 30 is clean and in liquid—in an exemplary embodiment, this value is approximately 128 units.

The value of these parameters is predetermined and set in the control unit 14 (and, more specifically, the probe modules 32). In an exemplary embodiment, the value of these parameters can be changed by the manufacturer based on a particular application. In another exemplary embodiment, the value of these parameters can be changed by the user based on a particular application.

When a probe 30 is clean and in steam, the probe reading will be around GS. Conversely, when a probe 30 is clean and in liquid, the probe reading will be around GW. As a clean probe 30 goes from in steam to in liquid, the probe reading will decrease from around GS to around GW. Similarly, as a clean probe 30 goes from in liquid to in steam, the probe reading will increase from around GW to around GS. As the probe reading decreases or increases, it will pass through TV. If a probe 30 is clean, the probe reading should instantaneously go from around GS to around GW or from around GW to around GS.

When a probe 30 is becoming contaminated and in steam, the probe reading will be below GS. As the probe 30 becomes more contaminated and in steam, the probe reading will be at or below OU. When the probe 30 is contaminated and in steam, the probe reading will be at or below BU. Conversely, when a probe 30 is becoming contaminated and in liquid, the probe reading will be above GW. As the probe 30 becomes more contaminated and in liquid, the probe reading will be at or above OL. When the probe 30 is contaminated and in liquid, the probe reading will be at or above BL.

A probe reading at or between OU and OL indicates that a probe 30 is becoming contaminated. A probe reading at or between BU and BL indicates that a probe 30 is contaminated. In order to ensure that a blowdown is needed, a blowdown is not indicated as soon as a probe reading is at or between BU and BL.

When a probe reading is at or between OU and OL, a blowdown timer is started. In an exemplary embodiment, after the blowdown timer is started, when a subsequent probe reading is above OU or below OL, the blowdown timer is reset. After the blowdown timer is started, when each subsequent probe reading is at or between OU and OL for a predetermined period of time, the blowdown timer is stopped and a blowdown flag is set. In an exemplary embodiment, the predetermined period of time is eighteen hours. In an exemplary embodiment, this period of time can be changed by the manufacturer based on a particular application. In another exemplary embodiment, this period of time can be changed by the user based on a particular application. After the blowdown flag is set, when a subsequent probe reading is at or between BU and BL, a blowdown indicator is turned on. In an exemplary embodiment, after the blowdown indicator is turned on, when a subsequent probe reading is above BU or below BL, the blowdown indicator remains on. In an exemplary embodiment, after the blowdown indicator is turned on, when a subsequent probe reading is above OU or below OL, the blowdown indicator is turned off and the process restarts.

Figure 5:
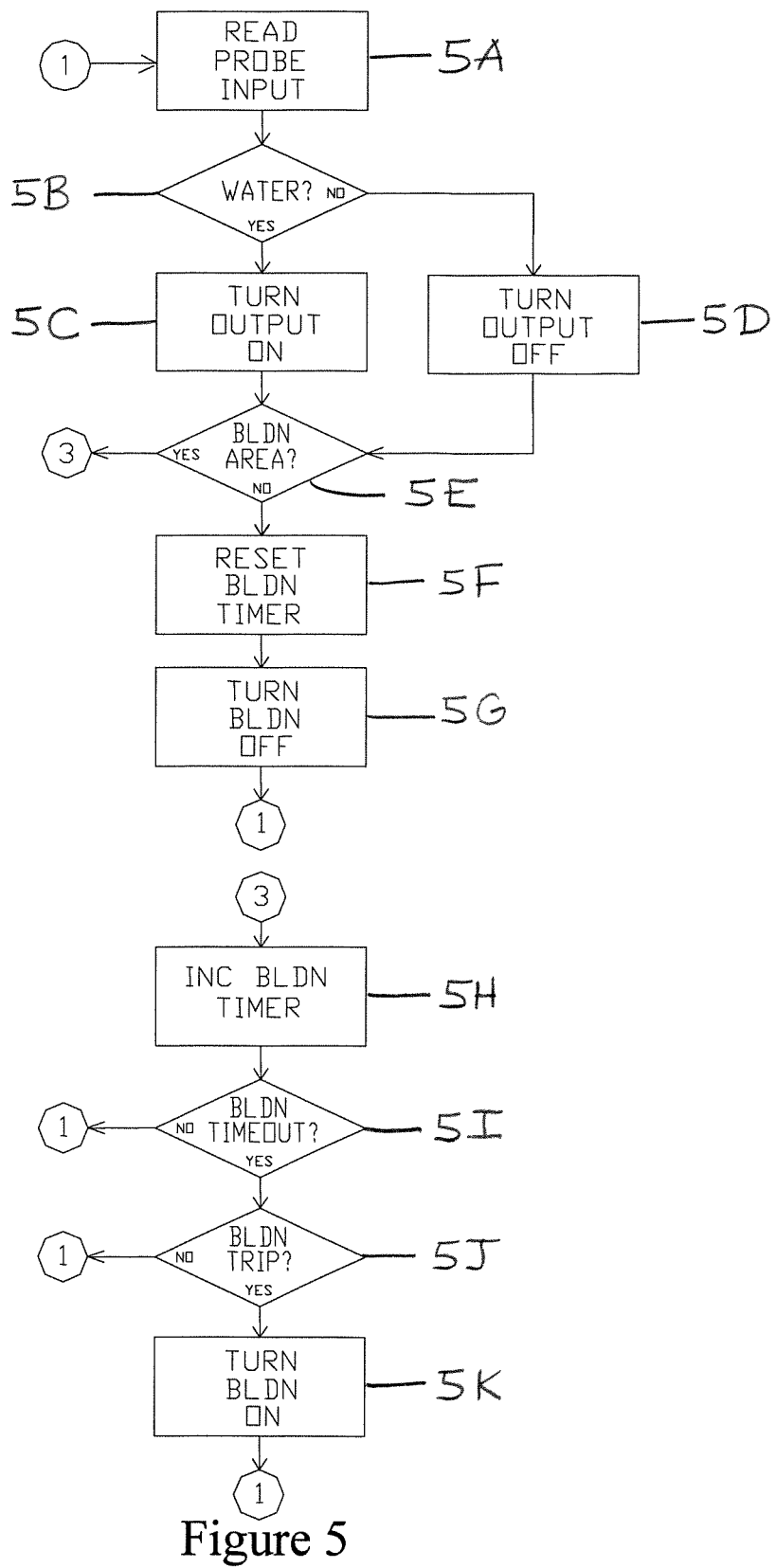
FIG. 5 is a flowchart illustrating steps taken to determine whether a probe of the liquid level system of FIG. 1 is in liquid or in steam and whether the probe is clean, becoming contaminated, or is contaminated.

The steps taken to determine whether a probe 30 is in liquid or in steam and to further determine whether the probe 30 is clean, becoming contaminated, or is contaminated are illustrated in FIG. 5. In step 5A, a probe reading is taken. In step 5B, the control unit 14 (and, more specifically, the corresponding probe module 32) determines if the probe 30 is in liquid or in steam. If the probe 30 is in liquid, in step 5C, the liquid indicator is turned on. If the probe 30 is in steam, in step 5D, the liquid indicator is not turned on or is turned off. In both cases, in step 5E, the control unit 14 (and, more specifically, the corresponding probe module 32) determines if the probe reading is at or between OU and OL. If the probe reading is not at or between OU and OL, in step 5F, the blowdown timer is not set or is reset, in step 5G, the blowdown indicator is not turned on or is turned off, and another probe reading is taken at step 5A. If the probe reading is at or between OU and OL, in step 5H, the blowdown timer is set or is incremented and, in step 5I, the control unit 14 (and, more specifically, the corresponding probe module 32) determines if the blowdown timer has timed out. If the blowdown timer has not timed out, another probe reading is taken at step 5A. If the blowdown timer has timed out, in step 5J, the control unit 14 (and, more specifically, the corresponding probe module 32) determines if the probe reading is at or between BU and BL. If the probe reading is not at or between BU and BL, another probe reading is taken at step 5A. If the probe reading is at or between BU and BL, in step 5K, the blowdown indicator is turned on.

Figure 6:
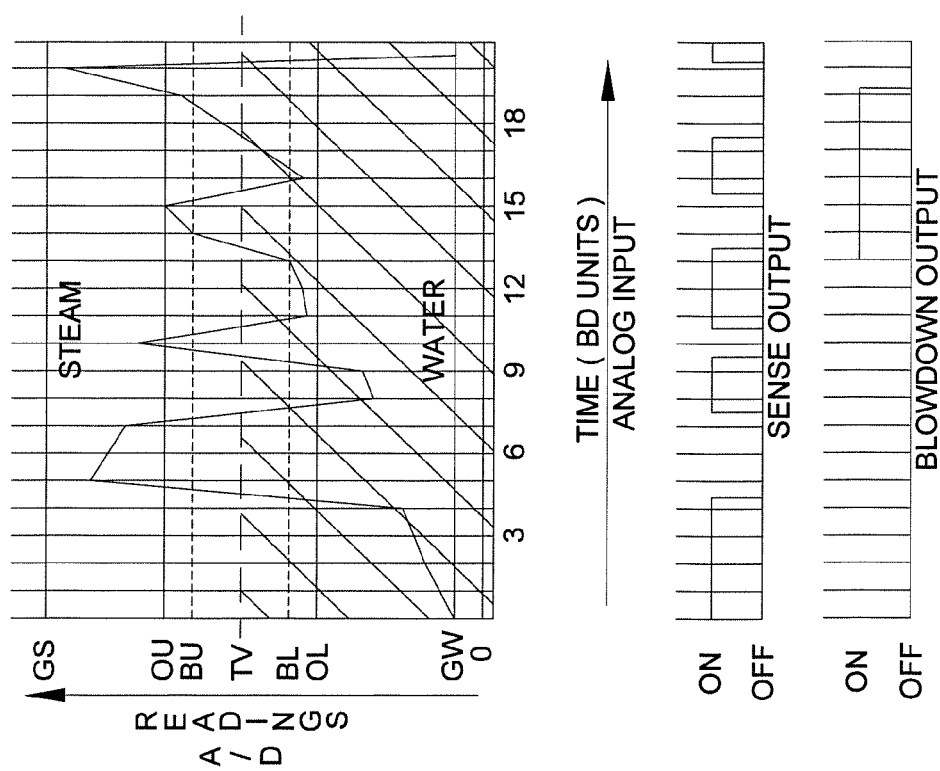
FIG. 6 is a graph illustrating sample probe readings and resulting liquid indicator output and blowdown indicator output.

Sample probe readings and the resulting liquid indicator output and blowdown indicator output are illustrated in FIG. 6. At time 0, the probe 30 is in liquid and is clean. From time 1-4, the probe 30 is in liquid and is degrading (i.e., becoming contaminated). From time 5-7, the probe 30 is in steam and is degrading (i.e., becoming contaminated). From time 8-9, the probe 30 is in liquid and is degrading (i.e., becoming contaminated). At time 10, the probe 30 is in steam and is degrading (i.e., becoming contaminated). From time 11-12, the probe 30 is in liquid and becoming contaminated. At time 13, the probe 30 is in liquid and is contaminated. At time 14, the probe 30 is in steam and is contaminated. At time 15, the probe 30 is in steam and is still contaminated. At time 16, the probe 30 is in liquid and is still contaminated. From time 17-20, the blowdown is occurring. Right after time 20, the probe 30 is in liquid and is clean.

One of ordinary skill in the art will now appreciate that the present invention provides a liquid level system with a blowdown feature. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A system for determining a blowdown condition in a liquid column, the system comprising:
    a column operable to be fluidly connected to a vessel for holding a liquid so that the level of liquid in the column corresponds to the level of liquid in the vessel, the column including a housing and a plurality of probes, the housing having a first end and a second end, the probes being operable to be inserted at least partially into the housing, the probes being spaced apart in the housing between the first end and the second end;
    a control unit operable to be electrically connected to each probe, the control unit configured to receive probe readings from each probe, the control unit configured to determine whether each probe is in liquid or in steam and to further determine whether a blowdown condition exists by comparing the probe readings to a plurality of parameters, the control unit using the probe readings, the plurality of parameters, a blowdown timer, and a blowdown flag in determining whether each probe is in liquid or in steam and in further determining whether the blowdown condition exists, the plurality of parameters including a good steam reading, an offset upper threshold, a blowdown upper threshold, a steam/liquid threshold, a blowdown lower threshold, an offset lower threshold, and a good liquid reading, wherein:
        when a probe reading for a probe is at or below the good steam reading and above the offset upper threshold, the probe reading indicates the probe is clean and in steam;
        when a probe reading for a probe is at or below the offset upper threshold and at or above the steam/liquid threshold, the probe reading indicates the probe is becoming contaminated and in steam;
        when a probe reading for a probe is at or below the blowdown upper threshold and at or above the steam/liquid threshold, the probe reading indicates the probe is contaminated and in steam;
        when a probe reading for a probe is at or above the blowdown lower threshold and below the steam/liquid threshold, the probe reading indicates the probe is contaminated and in liquid;
        when a probe reading for a probe is at or above the offset lower threshold and below the steam/liquid threshold, the probe reading indicates the probe is becoming contaminated and in liquid;
        when a probe reading for a probe is at or above the good liquid reading and below the offset lower threshold, the probe reading indicates the probe is clean and in liquid; and
        the steam/liquid threshold is an approximate midpoint between the good steam reading and the good liquid reading; and
    an output device operable to be electrically connected to the control unit, the output device configured to signal whether each probe is in liquid or in steam and to further signal whether the blowdown condition exists;
    wherein, when a probe reading for a probe is at or between the offset upper threshold and the offset lower threshold, the blowdown timer is started;
    wherein, after the blowdown timer is started, when each subsequent probe reading for the probe is at or between the offset upper threshold and the offset lower threshold for a predetermined period of time, the blowdown flag is set; and
    wherein, after the blowdown flag is set, when a subsequent probe reading for the probe is at or between the blowdown upper threshold and the blowdown lower threshold, the output device signals that the blowdown condition exists.

2. The system of claim 1,
    wherein, after the blowdown timer is started, when a subsequent probe reading is above the offset upper threshold or below the offset lower threshold, the blowdown timer is reset.

3. The system of claim 1,
    wherein, after the output device signals that the blowdown condition exists, when a subsequent probe reading is above the blowdown upper threshold or below the blowdown lower threshold, the output device continues to signal that the blowdown condition exists.

4. The system of claim 1,
wherein, after the output device signals that the blowdown condition exists, when a subsequent probe reading is above the offset upper threshold or below the offset lower threshold, the output device no longer signals that the blowdown condition exists.

5. The system of claim 1, wherein:
the offset upper threshold parameter is greater than the offset lower threshold parameter; and
the blowdown upper threshold parameter is greater than the blowdown lower threshold parameter.

6. The system of claim 1, wherein:
the offset upper threshold parameter is greater than the blowdown upper threshold parameter; and
the offset lower threshold parameter is less than the blowdown lower threshold parameter.

7. The system of claim 1, wherein:
the control unit includes a plurality of probe modules;
each probe corresponds to a separate probe module; and
each probe module is configured to receive probe readings from the corresponding probe and to determine whether the corresponding probe is in liquid or in steam and to further determine whether the blowdown condition exists.

8. A system for determining a blowdown condition in a liquid column, the system comprising:
a column operable to be fluidly connected to a vessel for holding a liquid so that the level of liquid in the column corresponds to the level of liquid in the vessel, the column including a housing and a plurality of probes, the housing having a first end and a second end, the probes being operable to be inserted at least partially into the housing, the probes being spaced apart in the housing between the first end and the second end; and
a control unit operable to be electrically connected to each probe, the control unit configured to receive probe readings from each probe, the control unit configured to determine whether each probe is in liquid or in steam and to further determine whether a blowdown condition exists by comparing the probe readings to a plurality of parameters, the control unit using the probe readings, the plurality of parameters, a blowdown timer, and a blowdown flag in determining whether each probe is in liquid or in steam and in further determining whether the blowdown condition exists, the plurality of parameters including a good steam reading, an offset upper threshold, a blowdown upper threshold, a steam/liquid threshold, a blowdown lower threshold, an offset lower threshold, and a good liquid reading, wherein:
when a probe reading for a probe is at or below the good steam reading and above the offset upper threshold, the probe reading indicates the probe is clean and in steam;
when a probe reading for a probe is at or below the offset upper threshold and at or above the steam/liquid threshold, the probe reading indicates the probe is becoming contaminated and in steam;
when a probe reading for a probe is at or below the blowdown upper threshold and at or above the steam/liquid threshold, the probe reading indicates the probe is contaminated and in steam;
when a probe reading for a probe is at or above the blowdown lower threshold and below the steam/liquid threshold, the probe reading indicates the probe is contaminated and in liquid;
when a probe reading for a probe is at or above the offset lower threshold and below the steam/liquid threshold, the probe reading indicates the probe is becoming contaminated and in liquid;
when a probe reading for a probe is at or above the good liquid reading and below the offset lower threshold, the probe reading indicates the probe is clean and in liquid; and
the steam/liquid threshold is an approximate midpoint between the good steam reading and the good liquid reading;
wherein, when a probe reading for a probe is at or between the offset upper threshold and the offset lower threshold, the blowdown timer is started;
wherein, after the blowdown timer is started, when each subsequent probe reading for the probe is at or between the offset upper threshold and the offset lower threshold for a predetermined period of time, the blowdown flag is set; and
wherein, after the blowdown flag is set, when a subsequent probe reading for the probe is at or between the blowdown upper threshold and the blowdown lower threshold, an output device signals that the blowdown condition exists.

9. The system of claim 8,
wherein, after the blowdown timer is started, when a subsequent probe reading is above the offset upper threshold or below the offset lower threshold, the blowdown timer is reset.

10. The system of claim 8,
wherein, after the output device signals that the blowdown condition exists, when a subsequent probe reading is above the blowdown upper threshold or below the blowdown lower threshold, the output device continues to signal that the blowdown condition exists.

11. The system of claim 8,
wherein, after the output device signals that the blowdown condition exists, when a subsequent probe reading is above the offset upper threshold or below the offset lower threshold, the output device no longer signals that the blowdown condition exists.

12. The system of claim 8, wherein:
the offset upper threshold parameter and the blowdown upper threshold parameter are greater than the steam/liquid threshold parameter; and
the offset lower threshold parameter and the blowdown lower threshold parameter are less than the steam/liquid threshold parameter.

13. The system of claim 8, wherein:
the offset upper threshold parameter is greater than the blowdown upper threshold parameter; and
the offset lower threshold parameter is less than the blowdown lower threshold parameter.

14. The system of claim 8, wherein:
the control unit includes a plurality of probe modules;
each probe corresponds to a separate probe module; and
each probe module is configured to receive probe readings from the corresponding probe and to determine whether the corresponding probe is in liquid or in steam and to further determine whether the blowdown condition exists.

15. A system for determining a blowdown condition in a liquid level column, the system comprising:
a control unit operable to be electrically connected to probes in a liquid column, the control unit configured to receive probe readings from each probe, the control unit configured to determine whether each probe is in liquid or in steam and to further determine whether a blowdown condition exists by comparing the probe readings to a plurality of parameters, the control unit using the probe readings, the plurality of parameters, a blowdown timer, and a blowdown flag in determining whether each probe is in liquid or in steam and in further determining whether the blowdown condition exists, the plurality of parameters including a good steam reading, an offset upper threshold, a blowdown upper threshold, a steam/liquid threshold, a blowdown lower threshold, an offset lower threshold, and a good liquid reading, wherein:

when a probe reading for a probe is at or below the good steam reading and above the offset upper threshold, the probe reading indicates the probe is clean and in steam;

when a probe reading for a probe is at or below the offset upper threshold and at or above the steam/liquid threshold, the probe reading indicates the probe is becoming contaminated and in steam;

when a probe reading for a probe is at or below the blowdown upper threshold and at or above the steam/liquid threshold, the probe reading indicates the probe is contaminated and in steam;

when a probe reading for a probe is at or above the blowdown lower threshold and below the steam/liquid threshold, the probe reading indicates the probe is contaminated and in liquid;

when a probe reading for a probe is at or above the offset lower threshold and below the steam/liquid threshold, the probe reading indicates the probe is becoming contaminated and in liquid;

when a probe reading for a probe is at or above the good liquid reading and below the offset lower threshold, the probe reading indicates the probe is clean and in liquid; and the steam/liquid threshold is an approximate midpoint between the good steam reading and the good liquid reading; and an output device operable to be electrically connected to the control unit, the output device configured to signal whether each probe is in liquid or in steam and to further signal whether the blowdown condition exists;

wherein, when a probe reading for a probe is at or between the offset upper threshold and the offset lower threshold, the blowdown timer is started;

wherein, after the blowdown timer is started, when each subsequent probe reading for the probe is at or between the offset upper threshold and the offset lower threshold for a predetermined period of time, the blowdown flag is set; and wherein, after the blowdown flag is set, when a subsequent probe reading for the probe is at or between the blowdown upper threshold and the blowdown lower threshold, the output device signals that the blowdown condition exists.

16. The system of claim 15,
wherein, after the blowdown timer is started, when a subsequent probe reading is above the offset upper threshold or below the offset lower threshold, the blowdown timer is reset.

17. The system of claim 15,
wherein, after the output device signals that the blowdown condition exists, when a subsequent probe reading is above the blowdown upper threshold or below the blowdown lower threshold, the output device continues to signal that the blowdown condition exists.

18. The system of claim 15,
wherein, after the output device signals that the blowdown condition exists, when a subsequent probe reading is above the offset upper threshold or below the offset lower threshold, the output device no longer signals that the blowdown condition exists.

19. The system of claim 15, wherein:
the offset upper threshold parameter is greater than the offset lower threshold parameter; and
the blowdown upper threshold parameter is greater than the blowdown lower threshold parameter.

20. The system of claim 15, wherein:
the offset upper threshold parameter is greater than the blowdown upper threshold parameter; and
the offset lower threshold parameter is less than the blowdown lower threshold parameter.

21. The system of claim 15, wherein:
the control unit includes a plurality of probe modules;
each probe corresponds to a separate probe module; and
each probe module is configured to receive probe readings from the corresponding probe and to determine whether the corresponding probe is in liquid or in steam and to further determine whether the blowdown condition exists.

* * * * *